Jan. 28, 1930.  L. C. JONES  1,745,098
NONSKID DRAG FOR AUTOMOBILES
Filed June 9, 1926   3 Sheets-Sheet 1
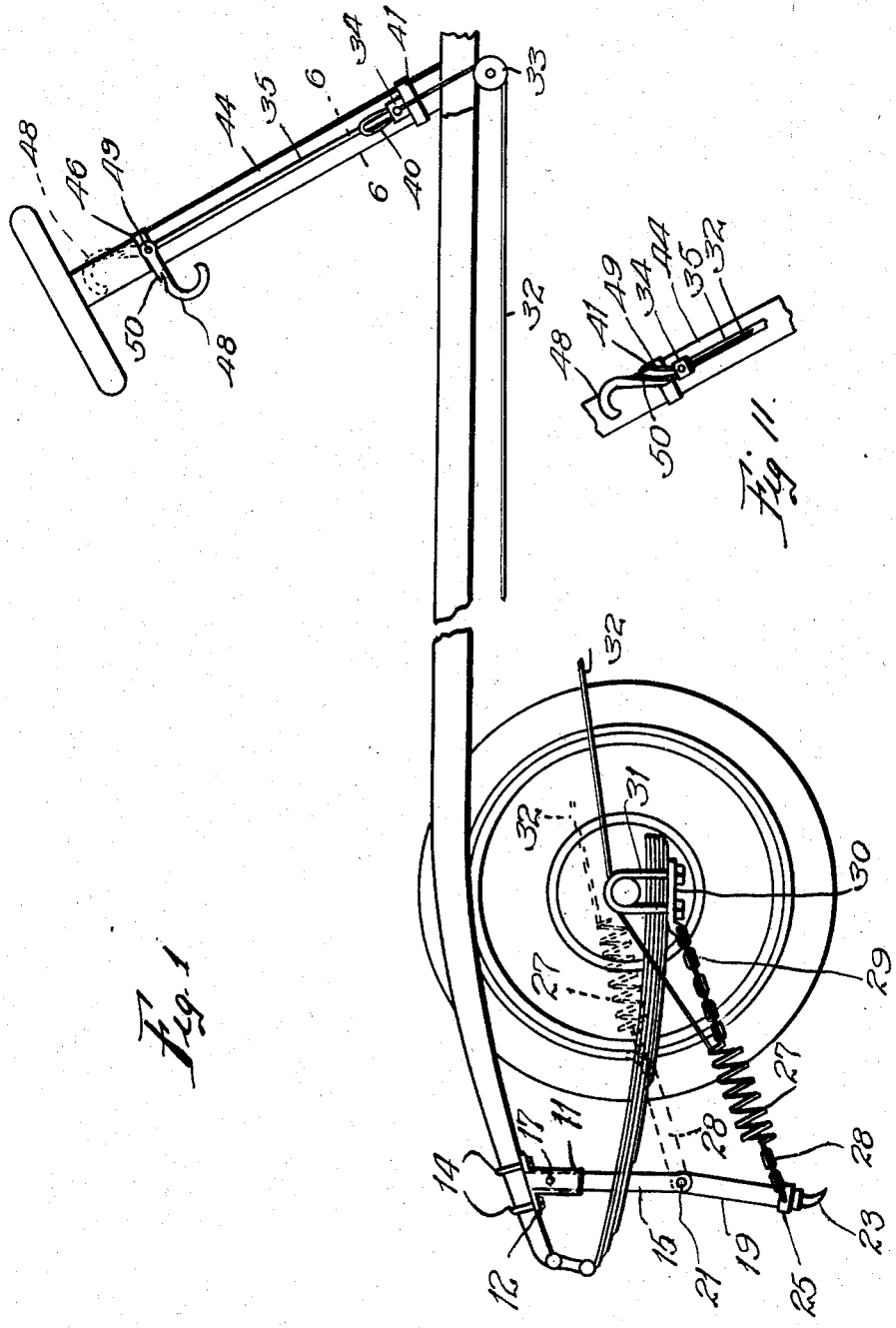
INVENTOR
Lewis C. Jones
By W. W. Williamson Atty Jan. 28, 1930.  L. C. JONES  1,745,098
NONSKID DRAG FOR AUTOMOBILES
Filed June 9, 1926   3 Sheets-Sheet 2
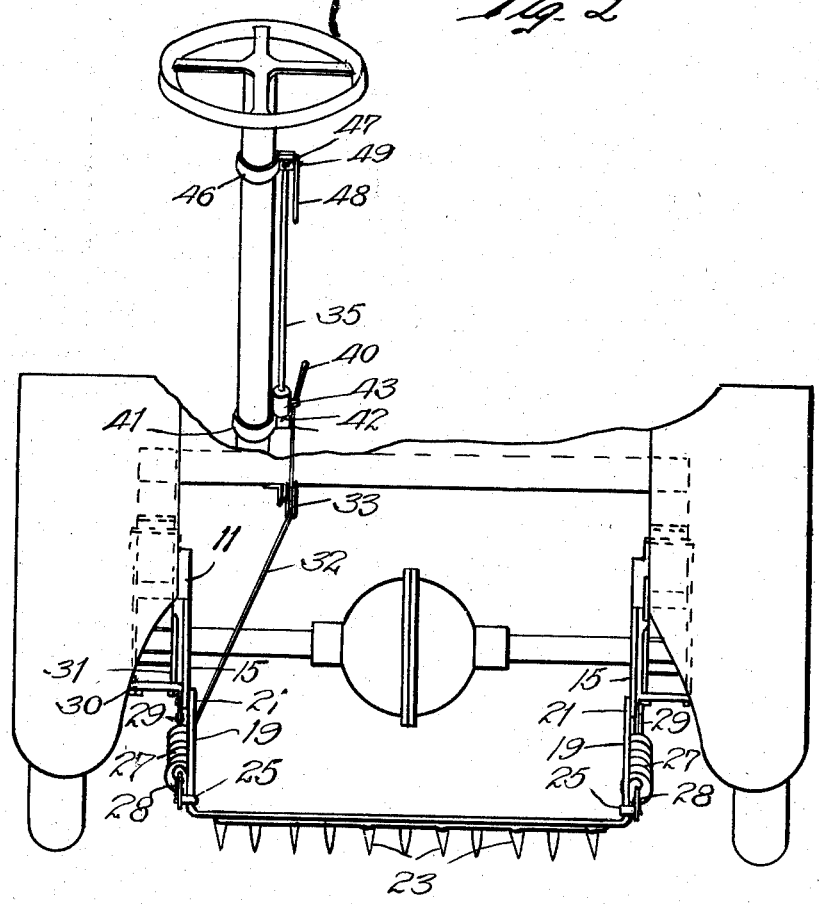
INVENTOR
Lewis C. Jones
By W. W. Williamson Atty.

Jan. 28, 1930. L. C. JONES 1,745,098
NONSKID DRAG FOR AUTOMOBILES
Filed June 9, 1926   3 Sheets-Sheet 3
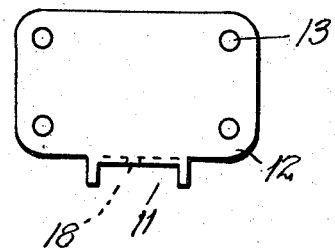
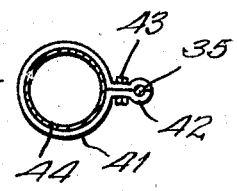
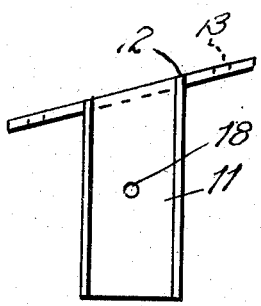
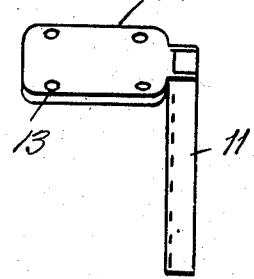
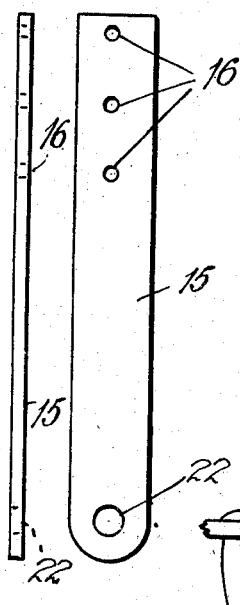
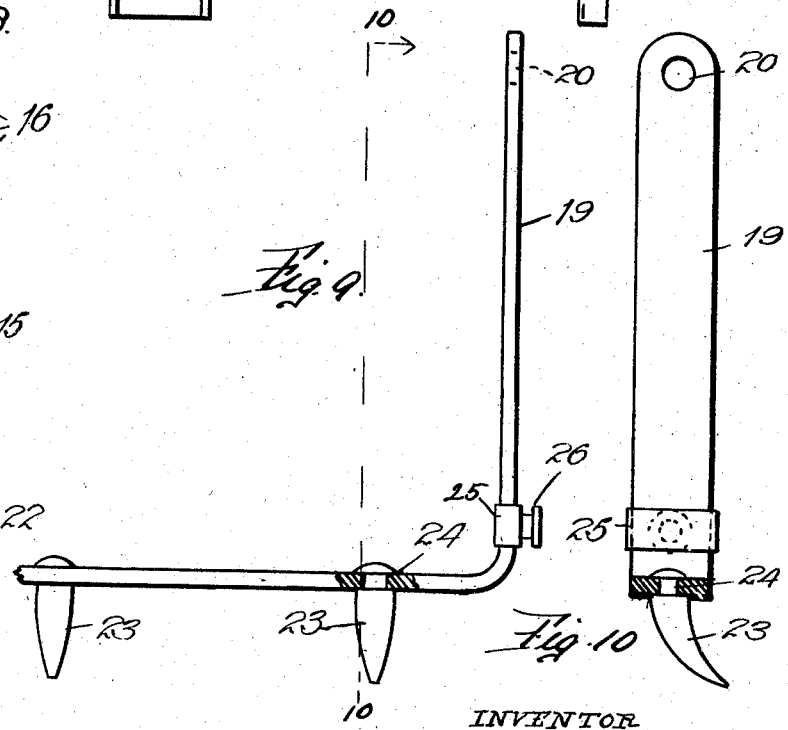
INVENTOR.
Lewis C. Jones
By W. W. Williamson Atty.

Patented Jan. 28, 1930

1,745,098

UNITED STATES PATENT OFFICE

LEWIS C. JONES, OF PHILADELPHIA, PENNSYLVANIA

NONSKID DRAG FOR AUTOMOBILES

Application filed June 9, 1926. Serial No. 114,704.

My invention relates to new and useful improvements in nonskid drags for automobiles, and has for its primary object to provide an exceedingly simple and effective device of this description which may be readily applied to any standard type of automobile and when so applied will be held out of action, but capable of being manually put instantaneously into action by the driver.

A further object of my invention is to provide for holding the teeth of the drag in spring actuated contact with the road bed when the drag has been put into action by the spring contact to prevent liability of breakage of the drag mechanism or injury to the automobile.

A still further object of my invention is to provide a simple and effective trip mechanism which is adapted to hold the drag out of action in a positive manner and yet provide for the instantaneous action by a single movement of the hand of the driver.

A still further object of this invention is to provide for adjusting the device relative to the chassis of the automobile so as to bring the teeth of the drag in the proper relative position to the automobile.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is a side view of a portion of a chassis of an automobile, one of the rear wheels being omitted by the axle being sectioned; my improved device being shown in elevation in its operative position.

Fig. 2, is a rear view of a portion of an automobile showing my device applied thereto and in the position shown in Fig. 1.

Fig. 3, is a plan view of the hanger for securing the device to the chassis of the automobile.

Fig. 4, is a side view of Fig. 3.

Fig. 5, is an edge view of the Fig. 4.

Fig. 6, is a section at the line 6—6 of Fig. 1, looking in the direction of the arrow.

Fig. 7, is an edge view of one of the hanger bars.

Fig. 8, is a face view of Fig. 7.

Fig. 9, is an elevation of the drag yoke partly broken away and also partly sectioned to show the method of securing the teeth thereto.

Fig. 10, is a section at the line 10—10 of Fig. 9, one of the teeth being left in elevation.

Fig. 11, is a detailed view showing the top mechanism in the position for holding the drag out of action.

In carrying out my invention as herein embodied, 11 represents a hanger, of which there are two, and this hanger has formed therewith the attachment plate 12 provided with the holes 13 for the passage of clip bolts 14 by means of which the plate is secured to the underside of the rear portion of the chassis.

Each of these hangers is in the form of channel iron, that is to say, provided with flanges, between which the hanger bars 15 are adapted to slide and be guided, these bars being adjustable upon the hangers by having a series of holes 16 formed therethrough for the passage of the bolts 17, each of which bolts also pass through the hole 18 in each hanger, thus giving three adjustments as here shown, or as many as may be necessary by the increase of the number of holes 16, as will be readily understood.

19 represents the drag yoke which is U shaped, its upper ends having the holes 20 therein for the passage of the bolts 21, which bolts also pass through the holes 22 in the hanger bars 15 in such manner as to pivot the yoke to these bars in order that said yoke may have a free swinging movement, and 23 represents a series of teeth, preferably of hardened steel, the shanks 24 thereof being passed through suitable holes in the horizontal portion of the yoke and secured therein by riveting heads thereon, as clearly shown in Figs. 9 and 10.

Upon the upright sections of the yoke are secured the bands 25, each of which has a headed stud 26 projecting outward there-from, and to these studs are attached the coil springs 27 by the chains 28, the opposite ends of the springs being connected by the chains 29 to the clip bolts 30, which latter are secured to the under side of the springs of the vehicle by the clip bolts 31, for the purpose hereinafter explained.

32 represents a cord or cable which is attached to the inner end of one of the springs 27, and this cable passes over a guide pulley 33 and thence upward, and has its upper end secured to the slide collar 34. This collar 34 is so mounted upon the guide rod 35 that it may be drawn up and down upon said rod, and also carries a loop 40.

A split ring 41 has the extension 42 through which the clamp bolt 43 passes for securing the ring upon the steering post 44, and in this extension is clamped the lower end of the guide rod 35, while the upper end of said guide rod is clamped in a corresponding extension by the split ring 46 secured by the bolt 47 upon the upper portion of the steering post.

48 represents the trip member which is pivoted at 49 to the ring 46, the free end of this trip member being curved to provide a convenient finger hole, and having a notch 50 with which the loop 40 is adapted to engage, and when this loop is so engaged and the trip member turned to the position shown in dotted lines in Fig. 1, and in full lines in Fig. 11, the trip member will be held in this position by the pull of the cable being prevented from further backward movement by any suitable stop not shown, since the line of said pull will then be back of the pivot point 49; but as soon as the trip member is swung forward so that this line of pull passes to the opposite side of said pivot point, the trip member will be swung downward by said pull and the loop will slip off of the hook permitting the sliding collar 34 to be drawn down the rod 35.

In practice, the trip member is set with the trip hooked thereto and therefore the cable drawn upward, which in turn will draw the yoke 19 to the position shown in dotted lines in Fig. 1, the chain 29 being of sufficient length to permit this movement, it being understood that a flexible cable or cord may be utilized in the place of this chain. In this position the drag will in no wise interfere with the operation or travel of the automobile, but should the automobile develop a tendency to skid or otherwise become unmanageable, it is only necessary for the driver to give an initial swinging movement to the trip member 48 to free the sliding collar and permit the downward swinging of the yoke 19 when the teeth 23 contacting with the road bed will be forced to the position shown in Fig. 1, and thereafter these teeth will drag upon the road bed under yielding tension of the springs 27, thus adjusting them to any unevenness in the road bed or obstructions, such as stones, and this drag acting as a rudder or steering mechanism, will immediately stop any skidding motion and also tend to arrest the forward momentum of the car bringing it to a relatively sudden stop.

The most important feature of this mechanism is that when the drag yoke is once released by the initial actuation of the trip member, no further manual operation is required for its effective use, since thereafter the springs 27 will continue to hold the teeth in yielding contact with the road bed, and even though the driver should become confused in a serious emergency, the mechanism will function, saving the probable destruction of the car and the lives of its occupants.

Should the teeth 23 become worn or dulled, they may be removed by filing or cutting off the heads of their shanks, and other teeth substituted therefor.

Of course I do not wish to be limited to the exact details of construction as herein shown as these may be varied within the limits of the appended claims without departing from the spirit of my invention.

Having thus fully described my invention, what I claim as new and useful is:

1. A non-skid drag comprising two hangers, each carrying a plate adapted to be secured to the under side of the rear portion of the chassis of an automobile; two hanger bars, adjustably attachable to said hangers; a yoke pivoted to the lower ends of said hanger members; said yoke having teeth projecting from the horizontal portion thereof; two coil springs connected with the yoke; two flexible extensions connecting the inner ends of said springs with the rear axle clips of the automobile; a cable attached to one of the coil springs in such manner that when the yoke is drawn into its inoperative position by said cable, the flexible extensions will flex out of action; and means for holding the cable in its forward drawn position and releasing said cable to permit the yoke to swing into active position.

2. In a device of the character described, adjustable hanger bars; a yoke pivoted to said bars; teeth projecting downward from the horizontal portion of said yoke; a spring attached to the yoke; flexible extensions connecting said springs to the clips of the vehicle springs; a cable adapted to draw the yoke into its inoperative position; and a trip member adapted to hold said cable against retrograde movement, said trip member also being adapted to free the cable to permit a retrograde movement thereof.

3. In combination with a nonskid drag for automobiles comprising a yoke having teeth for application to the road bed under yielding mechanical contact, of a flexible cable connected with said yoke; a guide pulley over which said cable runs; a sliding collar to which the upper end of the cable is attached; a guide rod upon which said collar is adapted to slide, said rod being supported upon the steering post of the automobile; a trip member pivotedly attached to said post, said member embodying a hook; and a loop carried by the sliding collar, said loop being adapted to engage the hook and hold the trip member in locked position by the pull of the cable upon said loop.

In testimony whereof, I have hereunto affixed my signature.

LEWIS C. JONES.